US012649530B2

(12) United States Patent　　(10) Patent No.: US 12,649,530 B2

Beatty　　(45) Date of Patent:　　Jun. 9, 2026

(54) WHEEL LOCK

(71) Applicant: JOHN D ROBA CO., INC., Clarence, NY (US)

(72) Inventor: Robert Edward Lee Beatty, Redding, CA (US)

(73) Assignee: John D. Roba Co., Inc., Clarence, NY (US)

( * ) Notice: Subject to any disclaimer, the term of this patent is extended or adjusted under 35 U.S.C. 154(b) by 17 days.

(21) Appl. No.: 18/914,706

(22) Filed: Oct. 14, 2024

(65) Prior Publication Data

US 2026/0103251 A1　　Apr. 16, 2026

(51) Int. Cl.
*B62D 43/00*　　(2006.01)

(52) U.S. Cl.
CPC ................................. *B62D 43/007* (2013.01)

(58) Field of Classification Search
CPC ......... E05B 73/00; E05B 77/44; B60B 3/165; B60B 7/16; B60R 25/00; B60R 25/09; B62D 43/007
See application file for complete search history.

(56) References Cited

U.S. PATENT DOCUMENTS

| | | | |
|---|---|---|---|
| 1,423,194 A | 7/1922 | Corbett | |
| 1,787,134 A | 12/1930 | Wise | |
| 1,837,683 A * | 12/1931 | Skaggs | B62D 43/007 |
| | | | 70/18 |
| 2,012,735 A * | 8/1935 | Swartz | B60B 7/16 |
| | | | 70/156 |

| | | | |
|---|---|---|---|
| 2,217,775 A * | 10/1940 | Smith | B60B 7/16 |
| | | | 70/168 |
| 2,328,301 A * | 8/1943 | Shaw, Jr. | B60B 7/16 |
| | | | 301/37.21 |
| 2,328,339 A * | 8/1943 | Heath | B60B 7/16 |
| | | | 236/44 R |
| 2,329,946 A * | 9/1943 | Schatzman | B60B 7/16 |
| | | | 301/35.624 |
| 2,333,722 A * | 11/1943 | Johnson | B60B 7/16 |
| | | | 301/5.1 |

(Continued)

FOREIGN PATENT DOCUMENTS

| | | |
|---|---|---|
| CN | 202029921 | 11/2011 |
| WO | 2005084964 | 9/2005 |

*Primary Examiner* — Kristina R Fulton
*Assistant Examiner* — Noah Horowitz
(74) *Attorney, Agent, or Firm* — Simpson & Simpson, PLLC

(57) ABSTRACT

A wheel lock arranged to engage a threaded wheel stud, comprising: a base having a first substantially planar section and a second section, the first section having an aperture, wherein the second section extends upwardly from the first section opposite the aperture and having a slot therein, the base having a locking section extending upwardly therefrom, the locking section having at least one aperture therein, and a pivoting member having a first substantially planar section and a second section, the first section having an aperture and a hollow cylinder extending downwardly coincident with the aperture, wherein the second section curls from the first section, the second section adapted to releasably engage the slot of the base's second section, the pivoting member having a slot therein and adapted to receive the locking section when the pivoting member is hingedly positioned over the base.

11 Claims, 5 Drawing Sheets

(56)     References Cited

U.S. PATENT DOCUMENTS

| | | | |
|---|---|---|---|
| 3,317,247 A * | 5/1967 | Lamme | B60B 7/16 |
| | | | 70/171 |
| 3,818,731 A * | 6/1974 | Waling | F16B 41/005 |
| | | | 285/80 |
| 4,054,323 A * | 10/1977 | Lewis | B60B 7/16 |
| | | | 301/37.35 |
| 4,280,348 A * | 7/1981 | Teston | F16B 23/0069 |
| | | | 301/108.4 |
| 4,751,833 A | 6/1988 | Stumpf | |
| 5,131,246 A | 7/1992 | Bonzer | |
| 7,673,482 B2 * | 3/2010 | Bosman | B60B 7/16 |
| | | | 70/225 |
| 9,227,678 B2 | 1/2016 | Bolton | |

* cited by examiner

WHEEL LOCK

FIELD OF THE INVENTION

The present invention generally relates to a wheel lock, specifically a wheel lock arranged to engage a threaded wheel stud.

BACKGROUND

Theft has been a prevailing issue worldwide, especially auto-related theft. Wheels, colloquially known as "rims," are a popular target for thieves, as alloy wheels are attractive, valuable, and sought-after, as are the tires that are usually attached thereto. It is estimated that over five hundred (500) complete sets of wheels, e.g., four (4) wheels, are stolen from U.S. households every single day. This problem is not limited to households, as car dealerships and auto repair shops are also victims of wheel theft, nor is this problem limited to the U.S.

Prior attempts to solve this issue are well-known. One solution is the utilization of specialized lug nuts that serve as wheel locks. The specialized lug nuts are intended to make it more difficult for a thief to remove without the exact matching socket, or "key." On one common style of specialized lug nut, the outer edge of the nut is round rather than multi-sided, and the top features a uniquely shaped slot into which the matching key fits to create the grip needed to unlock the nut from the lug. On another version of specialized lug nut, the outside of the lug nut is "keyed," so a specialty socket is required for removing them without damaging the wheel. No matter the design, without the matching key, a specialized lug nut is very difficult to remove since there are no edges to grab with a standard tool.

The issue with these specialized wheel locking lug nuts is that they are installed in place of the standard lug nuts on the wheel, thus, removal can be time-consuming or impossible with standard tools if the correct key isn't available. This can be particularly costly if a driver of a vehicle experiences a flat tire and needs to use a spare tire being secured with the specialized lug nut, but for whatever reason does not have the matching key, such as it was lost or stored apart from the vehicle. The driver would then need to be towed or given roadside assistance to try and remove the specialized lug nut without the matching key.

To avoid the use of the specialized wheel locking lug nuts, International Publication No. WO2005/084964 discloses a security device generally comprising a mounting part, a blocking part, and a locking member. In one embodiment, the security device includes a mounting part in the form of a first generally cylindrical- or cup-shaped body, and a blocking part in the form of a second generally cylindrical- or cup-shaped body. The mounting part has an aperture proximate to a first end, and a first section having a locking section with an aperture therein extending substantially perpendicularly upwardly from the first section. Additionally, the blocking part is releasably engageable with the mounting part, and the blocking part has a hollow section to prevent access to the threaded wheel stud. In another embodiment of the security device described in the international patent application, the mounting part is hingedly connected to the blocking part. However, the international application discloses a complex alternative which extends substantially from a wheel it is affixed to.

In another attempt to avoid the use of specialized locking lug nuts, U.S. Pat. No. 4,751,833 discloses a spare tire locking device comprised of a lug nut cover and a locking base plate. The locking base plate has a lock hasp with an opening at its outer end. Further, the lug nut cover of the '833 patent has a slot configured to receive the lock hasp. Although the '833 patent does disclose a wheel locking device, its configuration makes it cumbersome as multiple bolts from the respective wheel need to be engaged within the locking base.

Therefore, there is a long felt need for a wheel lock or wheel lock device that is simple in configuration, making manufacturing easy and efficient, designed with a minimal protruding profile, and also adapted to lock a respective wheel by only securing to a single threaded wheel stud.

SUMMARY

The invention broadly relates to a wheel lock arranged to engage a threaded wheel stud, the wheel lock comprising a base member having a first end and a second end, the base member having a first substantially planar section and a second section, the first section having an aperture proximate the first end, wherein the second section extends substantially perpendicularly upwardly from the first section at the second end, the second section having a slot therein, the base member also having a locking section extending substantially perpendicularly upwardly from the first section proximate the aperture, the locking section also arranged substantially perpendicularly to the second section, the locking section having at least one aperture therein, and a pivoting member having a first end and a second end, the pivoting member having a first substantially planar section and a second section, the first section having an aperture proximate the first end and a hollow cylinder extending substantially perpendicularly downwardly coincident with the aperture, wherein the second section curls from the first section at the second end, the second section operatively arranged to releasably engage the slot of the base member's second section, the pivoting member having a slot in the first section operatively arranged to receive the locking section of the base member when the pivoting member is hingedly positioned over the base member.

A general objective of the present invention is to provide a wheel lock that is simple in configuration and easy to use, without the use of specialized keys that are only provided by the manufacturer of the wheel lock.

A further objective of the present invention is to have the ability to lock a wheel by only securing the lock to a single threaded wheel stud used to secure the respective wheel.

These and other objects, features, and advantages of the present invention will become readily apparent upon a review of the following detailed description of the invention, in view of the drawings and appended claims.

BRIEF DESCRIPTION OF THE DRAWINGS

Various embodiments are disclosed, by way of example only, with reference to the accompanying drawings, in which corresponding reference symbols indicate corresponding parts, in which.

DETAILED DESCRIPTION

Figure 1:
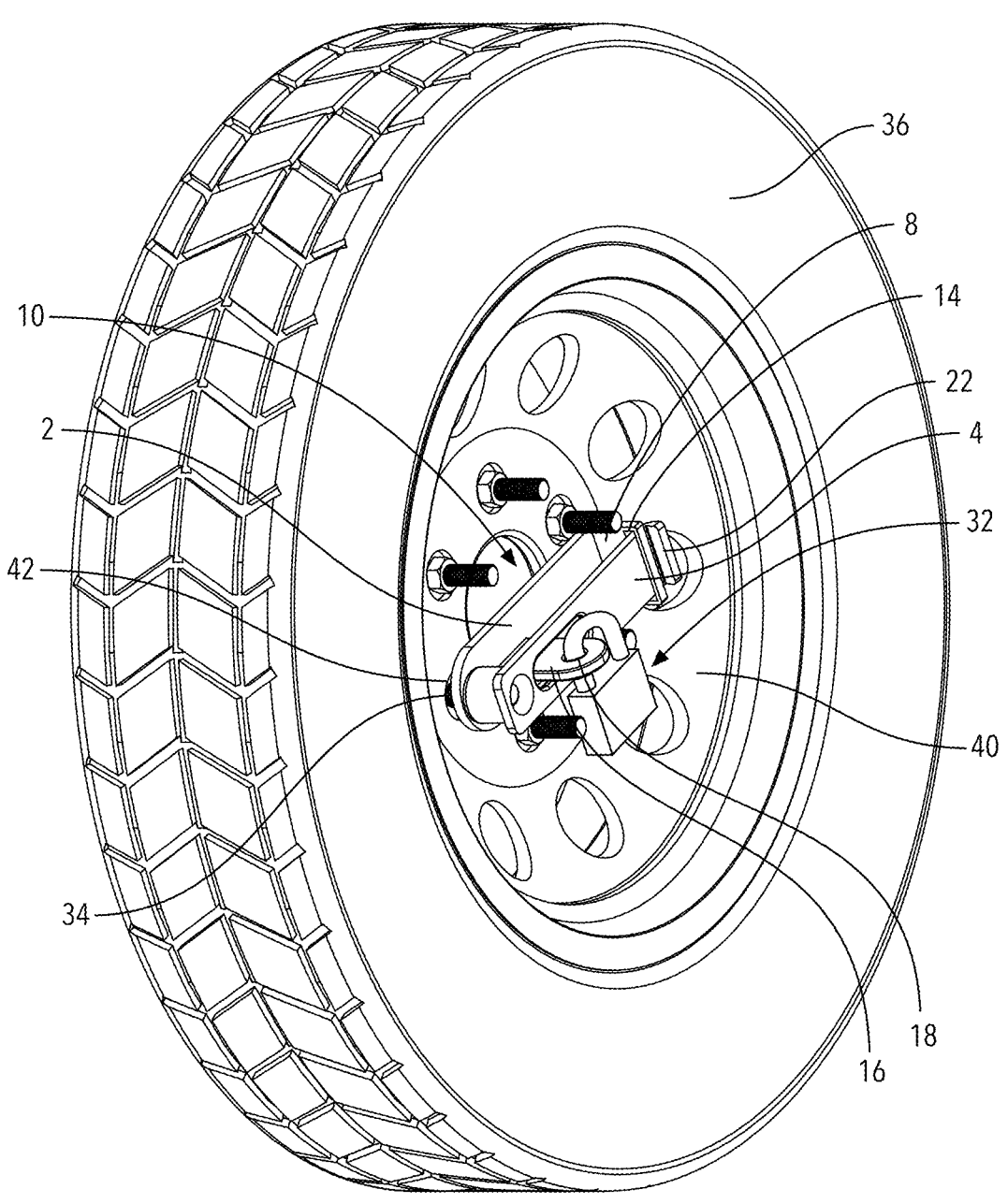
FIG. 1 generally illustrates the present invention engaged with a wheel of a vehicle.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and, as such, may, of course, vary. It is also understood that the terminology used herein is for the purpose of describing particular aspects only and is not intended to limit the scope of the claims.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

Adverting now to the Figures, FIG. 1 generally illustrates the present invention, e.g., wheel lock 10, engaged with wheel 40 of a vehicle, wheel 40 further supporting tire 36. In a preferred configuration, wheel lock 10 comprises base member 2 and pivoting member 4. Wheel lock 10 having lock 32 engaged with aperture 18 located within locking section 16, thereby locking second section 22 of pivoting member 4 within slot 14 of second section 8 of base member 2. Wheel lock 10 is further engaged with threaded wheel stud 34, which extends through lug hole 42 of wheel 40.

Figure 2A:
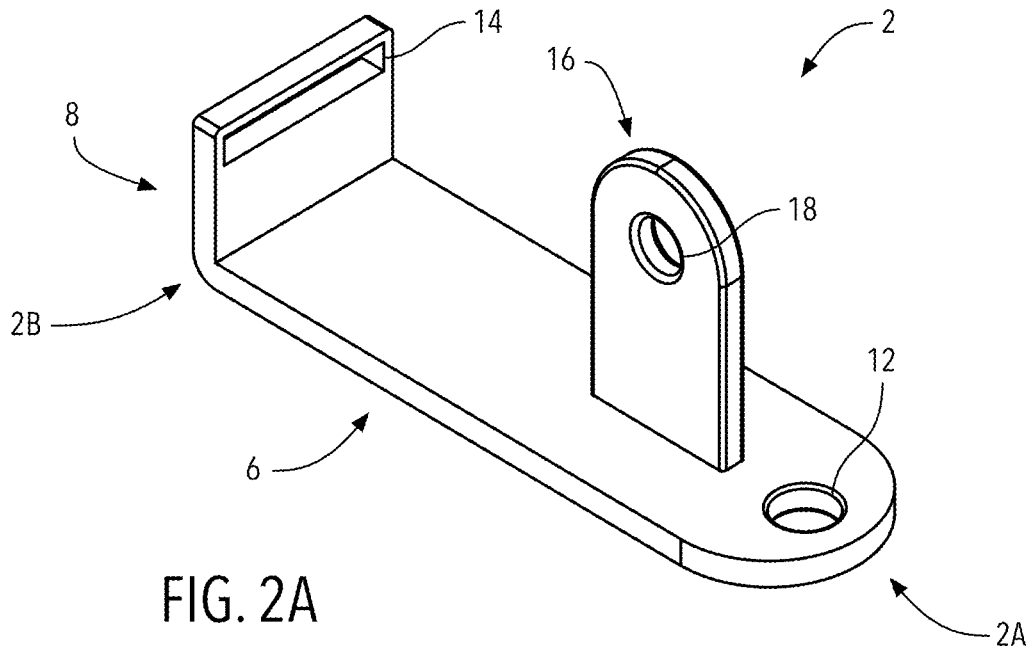
FIG. 2A is a perspective view of a base member of the invention shown in FIG. 1.

FIG. 2A is a perspective view of base member 2 shown in FIG. 1. In a preferred embodiment, base member 2 comprises first end 2A and second end 2B. Base member 2 further comprises substantially planar first section 6, and second section 8 extending therefrom proximate second end 2B. First section 6 includes aperture 12 proximate first end 2A. Second section 8 extends from first section 6, preferably in a substantially perpendicular and upwardly direction from first section 6 proximate second end 2B of base member 2. Preferably, second section 8 includes slot 14 therein. Base member 2 further includes locking section 16 extending substantially perpendicularly and upwardly from first section 6 proximate aperture 12. Locking section 16 preferably includes at least one aperture therein, e.g., aperture 18. In some arrangements, locking section 16 may be further arranged substantially perpendicular to second section 8, such that the respective spaces of each of slot 14 and aperture 18 are perpendicular.

Figure 2B:
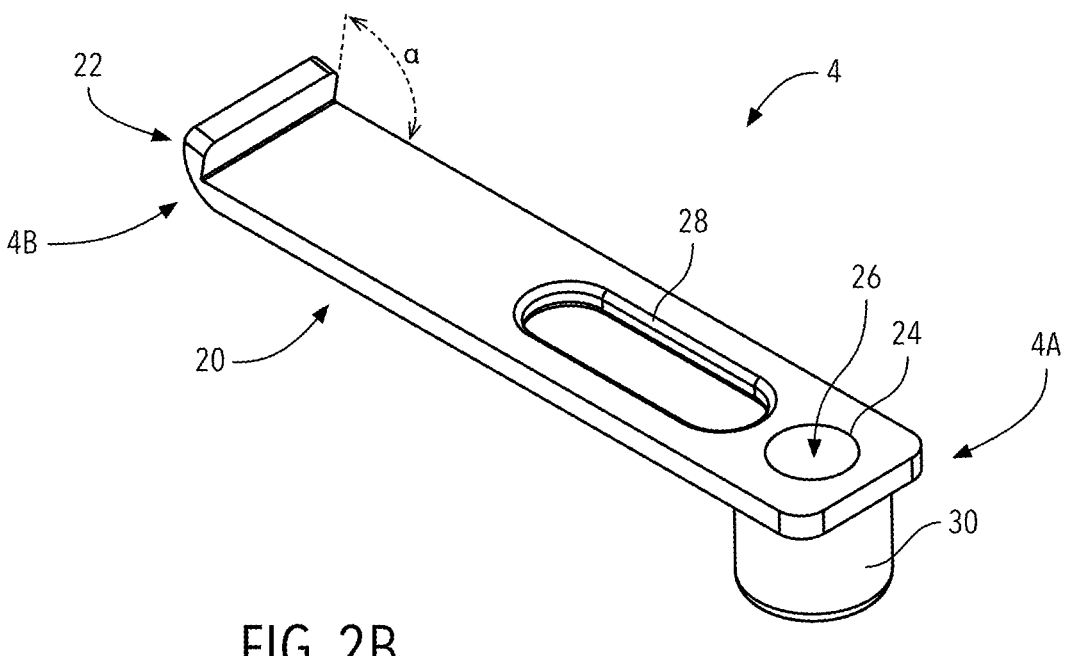
FIG. 2B is a perspective view of a pivoting member of the invention shown in FIG. 1.

FIG. 2B is a perspective view of pivoting member 4 shown in FIG. 1. In a preferred embodiment, pivoting member 4 comprises first end 4A and second end 4B. Pivoting member 4 has substantially planar first section 20, and second section 22 extending therefrom proximate second end 4B. First section 20 having aperture 24 therein proximate first end 4A. Further, hollow cylinder 30 extends substantially perpendicularly and downwardly from first section 20, in a coincident fashion with aperture 24, thereby forming hollow section 26. Pivoting member 4 further includes slot 28. In a preferred configuration, second section 22 extends from, preferably curls from, first section 20 at second end 4B, where second section 22 and first section 20 form angle α therebetween. Preferably, angle α is an acute angle, substantially configuring second section 22 as curling from first section 20 with a curved surface at the junction of second section 22 and first section 20.

Figure 3:
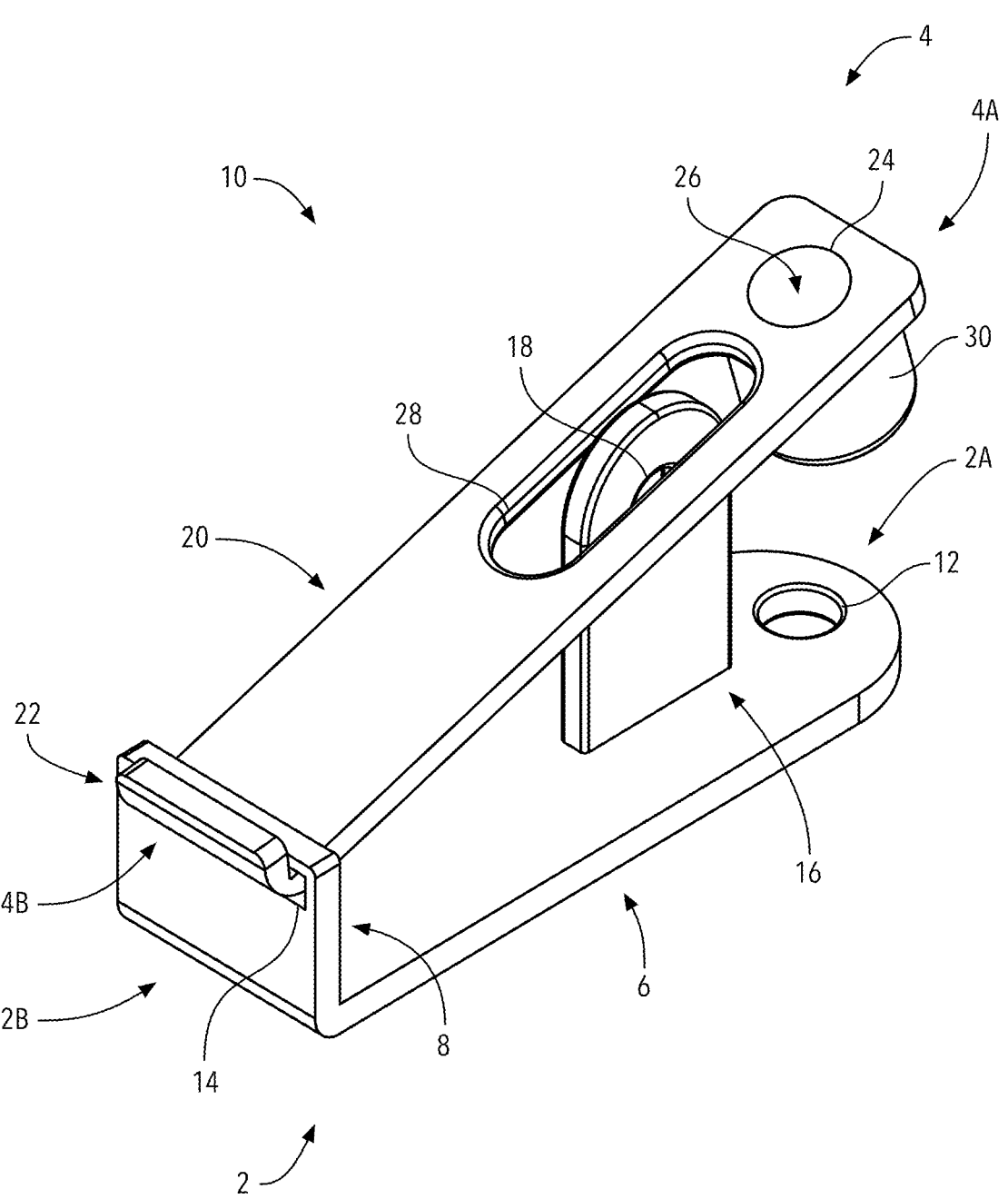
FIG. 3 is a perspective view of the invention shown in FIG. 1, removed from the wheel and in a substantially open position.

FIG. 3 is a perspective view of wheel lock 10, i.e., base member 2 and pivoting member 4, removed from wheel 40 and in a substantially open position. Base member 2 comprises first end 2A and second end 2B. Further, base member 2 comprises first section 6 and second section 8. Locking section 16 and aperture 12 are located proximate base member 2 first end 2A. In a preferred embodiment, locking section 16 includes at least one aperture therein, e.g., aperture 18. Second section 8 of base member 2, having slot 14 therein, is located proximate base member 2 second end 2B. Pivoting member 4 comprises first end 4A and second end 4B. Further, pivoting member 4 comprises first section 20 and second section 22. Aperture 24, hollow cylinder 30, hollow section 26, and slot 28 are located proximate pivoting member 4 first end 4A. Second section 22 of pivoting member 4 is located proximate pivoting member 4 second end 4B. In a preferred embodiment, second section 22 of pivoting member 4 is operatively arranged to releasably engage slot 14 of base member's 2 second section 8. Further, slot 28 is operatively arranged to receive locking section 16 of base member 2 when pivoting member 4 is hingedly positioned over base member 2.

Figures 4, 5, 6:
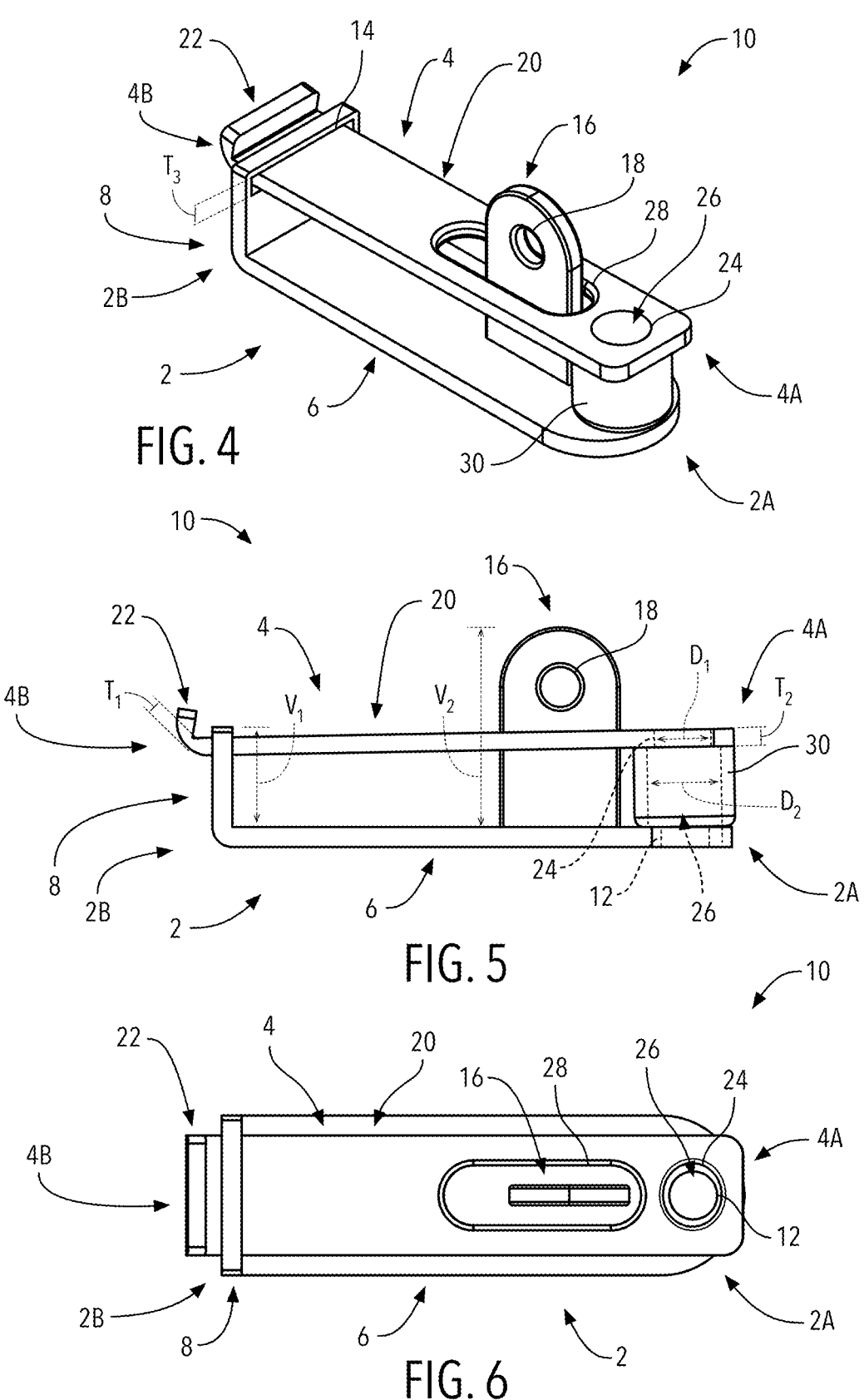
FIG. 4 is a perspective view of the invention shown in FIG. 3, in a substantially closed position.
FIG. 5 is a left-side view of the invention shown in FIG. 4.
FIG. 6 is a top plan view of the invention shown in FIG. 4.

FIG. 4 is a perspective view of wheel lock 10 shown in FIG. 3 in a substantially closed position. When pivoting member 4 is hingedly positioned over base member 2, pivoting member 4 first end 4A is proximate base member 2 first end 2A, and pivoting member 4 second end 4B is proximate base member 2 second end 2B. Base member 2 comprises substantially planar first section 6, and second section 8 extending therefrom proximate second end 2B. Second section 8 extends from first section 6, preferably in a substantially perpendicular and upwardly direction from first section 6 proximate second end 2B of base member 2. Preferably, second section 8 includes slot 14 therein having a height $T_3$. Base member 2 further includes locking section 16 extending substantially perpendicularly and upwardly from first section 6. Locking section 16 preferably includes at least one aperture therein, e.g., aperture 18. In some arrangements, locking section 16 may be further arranged substantially perpendicular to second section 8, such that the respective spaces of each of slot 14 and aperture 18 are perpendicular. Pivoting member 4 has substantially planar first section 20, and second section 22 extending therefrom proximate second end 4B. First section 20 having aperture 24 therein proximate first end 4A. Further, hollow cylinder 30 extends substantially perpendicularly and downwardly from first section 20, in a coincident fashion with aperture 24, thereby forming hollow section 26. Pivoting member 4 further includes slot 28.

FIG. 5 is a left-side view of wheel lock 10 shown in FIG. 4. Base member 2 comprises first end 2A and second end 2B. Base member 2 further comprises substantially planar first section 6, and second section 8 extending therefrom proximate second end 2B. Second section 8 extends from first section 6, preferably in a substantially perpendicular and upwardly direction from first section 6 proximate second end 2B of base member 2. Base member 2 further includes locking section 16 extending substantially perpendicularly and upwardly from first section 6. Locking section 16 preferably includes at least one aperture therein, e.g., aperture 18. In a preferred embodiment, second section 8 extends first vertical distance $V_1$ from first section 6, and locking section 16 extends second vertical distance $V_2$ from first section 6, $V_2$ being a greater distance than $V_1$. First section 6 further includes aperture 12 proximate first end 2A. Pivoting member 4 comprises first end 4A and second end 4B. Pivoting member 4 has substantially planar first section 20, and second section 22 extending therefrom proximate second end 4B. In a preferred configuration, second section 22 extends from, preferably curls from, first section 20 at second end 4B, where second section 22 and first section 20 form angle α therebetween. Preferably, angle α is an acute angle, substantially configuring second section 22 as curling from first section 20 with a curved surface at the junction of second section 22 and first section 20. In a preferred embodiment, the junction of second section 22 and first section 20 of pivoting member 4 has junction thickness $T_1$, and first section 20 has thickness $T_2$, $T_1$ being less thick than $T_2$. Further, slot 14 has height $T_3$ (shown in FIG. 4), thickness $T_2$ being less than slot height $T_3$. Pivoting member 4 further comprises aperture 24 having diameter $D_1$, and hollow cylinder 30 having a through-bore having diameter $D_2$, $D_2$ being a greater distance than $D_1$. When pivoting member 4 is hingedly positioned over base member 2 in a substantially closed position, aperture 24, hollow cylinder 30, hollow section 26, and aperture 12 align, allowing threaded wheel stud 34 (shown in FIG. 7) to engage wheel lock 10.

FIG. 6 is a top plan view of wheel lock 10 shown in FIG. 4. Base member 2 comprises first end 2A and second end 2B. Base member 2 further comprises substantially planar first section 6, and second section 8 extending therefrom proximate second end 2B. First section 6 includes aperture 12 proximate first end 2A. Second section 8 extends from first section 6, preferably in a substantially perpendicular and upwardly direction from first section 6 proximate second end 2B of base member 2. Base member 2 further includes locking section 16 extending substantially perpendicularly and upwardly from first section 6 proximate aperture 12. Pivoting member 4 comprises first end 4A and second end 4B. Pivoting member 4 has substantially planar first section 20, and second section 22 extending therefrom proximate second end 4B. First section 20 having aperture 24 therein proximate first end 4A. Further, hollow cylinder 30 (shown in FIG. 5) extends substantially perpendicularly and downwardly from first section 20, in a coincident fashion with aperture 24, thereby forming hollow section 26. Pivoting member 4 further includes slot 28.

Figure 7:
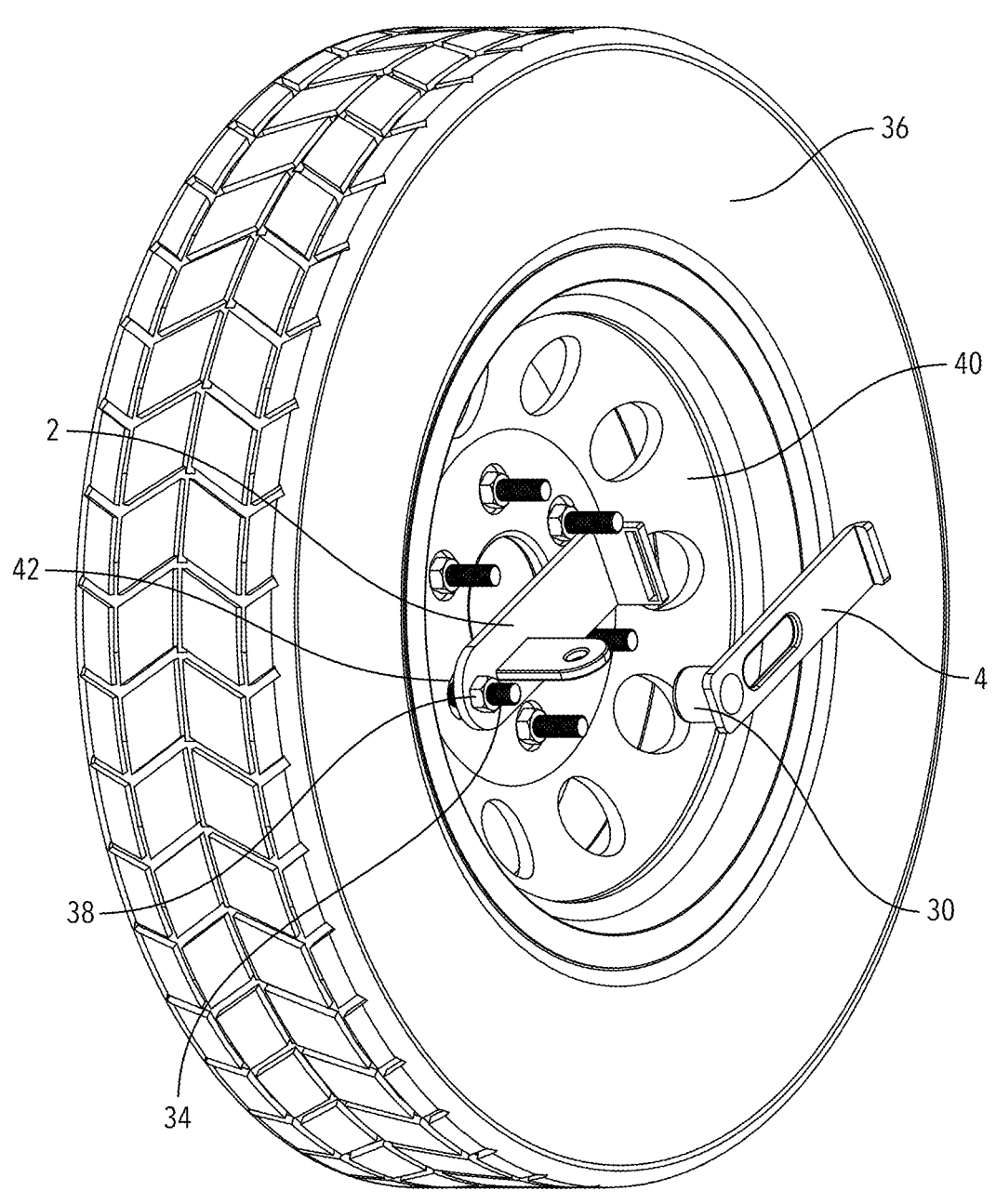
FIG. 7 generally illustrates the invention engaged with a wheel of a vehicle shown in FIG. 1, with the pivoting member separated from the base member.

FIG. 7 generally illustrates wheel lock 10 engaged with wheel 40 of a vehicle shown in FIG. 1, with pivoting member 4 separated from base member 2. Wheel 40 further supporting tire 36. Base member 2 is further engaged with threaded wheel stud 34, which extends through lug hole 42 of wheel 40. Nut 38 is threadably engaged with threaded wheel stud 34, securing base member 2 to threaded wheel stud 34. When pivoting member 4 is hingedly secured to base member 2, hollow cylinder 30 covers threaded wheel stud 34 and nut 38.

It will be appreciated that various aspects of the invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMBERS

2 Base member
2A Base member first end

2B Base member second end
4 Pivoting member
4A Pivoting member first end
4B Pivoting member second end
6 First section
8 Second section
10 Wheel lock
12 Aperture
14 Slot
16 Locking section
18 Aperture
20 Frist section
22 Second section
24 Aperture
26 Hollow section
28 Slot
30 Hollow cylinder
32 Lock
34 Threaded wheel stud
36 Tire
38 Nut
40 Wheel
42 Lug hole
$D_1$ Aperture diameter
$D_2$ Hollow cylinder through-bore diameter
$T_1$ Bend thickness
$T_2$ Pivoting member first section thickness
$T_3$ Base member slot height
$V_1$ First vertical distance
$V_2$ Second vertical distance
$\alpha$ Angle
What is claimed is:

1. A wheel lock arranged to engage a threaded wheel stud, comprising:

a base member having a first base member end and a second base member end, the base member having a first substantially planar base member section and a second base member section, said the first base member section having a base member aperture proximate the first base member end, wherein the second base member section extends substantially perpendicularly upwardly from the first base member section at the second base member end, the second base member section having a base member slot therein, the base member also having a locking section extending substantially perpendicularly upwardly from the first base member section proximate the base member aperture, the locking section also arranged substantially perpendicularly to the second base member section, the locking section having at least one locking section aperture therein; and, a pivoting member having a first pivoting member end and a second pivoting member end, the pivoting member having a first substantially planar pivoting member section and a second pivoting member section, the first pivoting member section having a pivoting member aperture proximate the first pivoting member end and a hollow cylinder extending substantially perpendicularly downwardly coincident with the pivoting member aperture, wherein the second pivoting member section curls from the first pivoting member section at the second pivoting member end, the second pivoting member section operatively arranged to releasably engage the base member slot, the pivoting member having a pivoting member slot in the first pivoting member section operatively arranged to receive the locking section of the base member when the pivoting member is hingedly positioned over the base member.

2. The wheel lock recited in claim 1, wherein the first substantially planar pivoting member section and the second pivoting member section form an acute angle therebetween.

3. The wheel lock recited in claim 1, wherein the pivoting member aperture has a first diameter, wherein the hollow cylinder comprises a through-bore therein, the through-bore having a second diameter, the second diameter is greater than the first diameter.

4. The wheel lock recited in claim 1, wherein second base member section extends substantially perpendicularly upwardly from the first base member section a first vertical distance and the locking section extends substantially perpendicularly upwardly from the first base member section a second vertical distance, the second vertical distance is greater than the first vertical distance.

5. The wheel lock recited in claim 1, wherein the base member aperture is adapted to accept a lock therethrough, thereby locking the second pivoting member section within the base member slot.

6. The wheel lock recited in claim 1, wherein the junction of the second pivoting member section and the first pivoting member section said pivoting member has a first thickness and the first pivoting member section has a second thickness, the first thickness being less than the second thickness.

7. The wheel lock recited in claim 6, wherein the base member slot a slot height, the second thickness less than the slot height.

8. A wheel lock arranged to engage a threaded wheel stud, comprising:

a base member having a first end and a second end, the base member comprising:

a first substantially planar base member section having an aperture proximate the first end of the base member;

a second base member section extending substantially perpendicularly upwardly from the first base member section at the second end of the base member, the second base member section having a base member slot therein; and, a locking section extending substantially perpendicularly upwardly from the first base member section proximate the aperture, the locking section having at least one locking section aperture therein;

wherein the locking section is arranged substantially perpendicularly to the second base member section; and, a pivoting member configured to be hingedly positioned over the base member to engage the base member slot and receive the locking section of the base member.

9. The wheel lock recited in claim 8, wherein the pivoting member comprises a first substantially planar pivoting member section and a second pivoting member section, wherein the second pivoting member section curls from the first pivoting member section to operatively engage the base member slot.

10. The wheel lock recited in claim 9, wherein the first substantially planar pivoting member section and the second pivoting member section form an acute angle therebetween.

11. The wheel lock recited in claim 8, wherein the at least one locking section aperture is adapted to accept a lock therethrough, thereby locking a portion of the pivoting member within the base member slot.

* * * * *